(12) United States Patent
Dordevic

(10) Patent No.: US 8,113,251 B2
(45) Date of Patent: Feb. 14, 2012

(54) ANTI-SKID DEVICE FOR A TIRE

(76) Inventor: Sasa Dordevic, Cervignano Del Friuli (IT)

( * ) Notice: Subject to any disclaimer, the term of this patent is extended or adjusted under 35 U.S.C. 154(b) by 150 days.

(21) Appl. No.: 12/522,199

(22) PCT Filed: Feb. 8, 2008

(86) PCT No.: PCT/EP2008/051539
§ 371 (c)(1),
(2), (4) Date: Jul. 6, 2009

(87) PCT Pub. No.: WO2008/098879
PCT Pub. Date: Aug. 21, 2008

(65) Prior Publication Data
US 2009/0308516 A1    Dec. 17, 2009

(30) Foreign Application Priority Data
Feb. 12, 2007    (IT) .............................. UD2007A0027

(51) Int. Cl.
*B60C 11/00* (2006.01)
*B60C 27/00* (2006.01)

(52) U.S. Cl. ...................... 152/210; 152/226; 152/191

(58) Field of Classification Search ................. 301/41.1, 301/42–43, 44.1; 152/167, 169–170, 173, 152/175–176, 178–180, 182, 185, 187–188, 152/190–191, 208, 213 R, 219, 225 R, 226
See application file for complete search history.

(56) References Cited

U.S. PATENT DOCUMENTS

| 736,683 A | * | 8/1903 | Butler ........................... 152/182 |
| 2,276,640 A | | 3/1942 | Ansel |
| 2,687,759 A | | 8/1954 | Johannes |
| 7,624,778 B2 | * | 12/2009 | Park, II .......................... 152/220 |

FOREIGN PATENT DOCUMENTS
GB            125882 A     5/1919
* cited by examiner

*Primary Examiner* — Jason Bellinger
(74) *Attorney, Agent, or Firm* — David A. Guerra

(57) ABSTRACT

An anti-skid tire device for increasing the grip of a tire of a vehicle on a road surface. The device includes a plurality of modules associated with each other to form substantially a chain disposed annularly around the tire's external surface. The modules each have a shaped plate with a plurality of gripping elements protruding during use towards the outside of the shaped plate, so as to improve the tire's ability to grip the road surface. An attachment element is include which has a first end associated with the shaped plate, a second end selectively attachable to a shaped plate of an adjacent module, and a central body radially facing towards the tire and inserted into a corresponding groove provided on the tire's external surface. The attachment element further has at least one adjustment member adapted to adjust the size of the anti-skid device with respect to the tire.

19 Claims, 2 Drawing Sheets

ANTI-SKID DEVICE FOR A TIRE

CROSS-REFERENCE TO RELATED APPLICATIONS

This application is an U.S. national phase application under 35 U.S.C. §371 based upon co-pending International Application No. PCT/EP2008/051539 filed on Feb. 8, 2008. Additionally, this U.S. national phase application claims the benefit of priority of co-pending International Application No. PCT/EP2008/051539 filed on Feb. 8, 2008 and Italy Application No. UD2007A000027 filed on Feb. 12, 2007. The entire disclosures of the prior applications are incorporated herein by reference. The international application was published on Aug. 21, 2008 under Publication No. WO 2008/098879.

FIELD OF THE INVENTION

The present invention concerns an anti-skid device applicable on the external surface of a tire of a drive wheel of a motor vehicle, to prevent the latter skidding on snowy and/or icy road surfaces. In particular, the anti-skid device according to the present invention is of the modular type, that is, consisting of a plurality of modules, selectively able to be associated with each other to form substantially a chain disposed annularly around the external surface of the tire.

Modular anti-skid chains as mentioned in the preamble of the main claim are disclosed in U.S. Pat. Nos. 2,276,640 and 2,687,759.

BACKGROUND OF THE INVENTION

Snow chains and other anti-skid devices are known, which are applied annularly around the external surface or tread of a tire of a motor vehicle.

Anti-skid devices of a modular type are also known, which comprise a plurality of modules connected reciprocally with each other, around the tire.

Both traditional snow chains and also anti-skid devices of a modular type include lateral portions which cooperate at least with the lateral sides of the tire, so as to guarantee their correct and secure positioning, centered with respect to the tire.

However, this lateral conformation entails a progressive deterioration of the sides of the tire and/or alloy rims, if any, or studs covering the rims, on which the tire is mounted.

Another disadvantage of known chains or anti-skid devices is that, since they have to cooperate at least with the lateral sides of the tire, their lateral size must necessarily be coordinated and specific in relation to the width of the tire on which they are mounted.

This disadvantage entails the need to make a high number of different serial sizes of chains or anti-skid devices, according to the different sizes of the tires.

Purpose of the present invention is to achieve an anti-skid device for a tire that is simple and economical to make, that does not have a size strictly connected to the lateral sizes of the tire, and that does not cause damage to the lateral sides of the tire on which it is mounted and/or to the relative alloy rims or rim-covers provided.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purpose, an anti-skid device for a tire according to the present invention is of the modular type, in which each module is associated with an analogous adjacent module so as to form substantially a chain disposed annularly around a circular external surface of the tire.

According to a characteristic feature of the present invention, each module comprises a shaped plate, roughly substantially triangular with rounded corners in its external shape, and provided, on its surface, with ridges, studs, protrusions, hollows or other shaped gripping means, protruding during use towards the outside, so as to improve the tire's ability to grip on the road surface.

According to the invention, each module also comprises an attachment element having a first end associated stably with the relative shaped plate and a second end selectively attachable to a shaped plate of an adjacent module. The attachment element also comprises a central body facing, in use, towards the tire and conformed so as to be able to be inserted with slight interference into the groove of the tread of the tire.

In this way, the attachment element not only determines the reciprocal connection of two adjacent modules but also functions as a positioning, centering and stabilizing element for the device according to the invention, since its insertion with slight interference into the tread of the tire guarantees that it is maintained in a suitable working position with respect to the tire.

With the present invention, therefore, there is no need to provide parts of the device that act laterally to the tire in order to guarantee correct positioning, but this position is maintained autonomously by the attachment elements of each module.

This advantage, substantially dis-associating the size of the modules from the lateral size of the tire, allows to make, with the same coverage of several widths of tires, a limited number of serial sizes of devices, thus reducing the overall costs of production and pieces stored.

Clearly, since no lateral parts are provided, the anti-skid device according to the present invention does not cause any wear or deterioration either to the lateral sides of the tire or to any alloy rims or rim-covers.

Another advantage of the present invention is the simplicity and limited number of components that form each module. In fact, each module consists of only two elements which can be produced in series and easily associated with each other, for example by male-female coupling.

In a preferential form of embodiment of the present invention, the gripping means made protruding towards the outside from the shaped plate faces in both possible directions of movement of the tire, so as to guarantee substantially the same grip on the road surface whether the vehicle is proceeding forwards or in reverse.

According to another form of preferential embodiment of the invention, the anti-skid device comprises adjustment means, mechanical and/or elastic, able to cooperate with two adjacent modules so as to allow, once the anti-skid device has been positioned around the circular external surface of the tire, to adapt the size of the anti-skid device to the size of the external circumference of the tire.

According to a variant, at least one of the modules that make up the anti-skid device comprises an attachment element provided with adjustment means.

BRIEF DESCRIPTION OF THE DRAWINGS

These and other characteristics of the present invention will become apparent from the following description of a preferential form of embodiment, given as a non-restrictive example with reference to the attached drawings wherein.

DETAILED DESCRIPTION OF A PREFERENTIAL FORM OF EMBODIMENT

Figure 1:
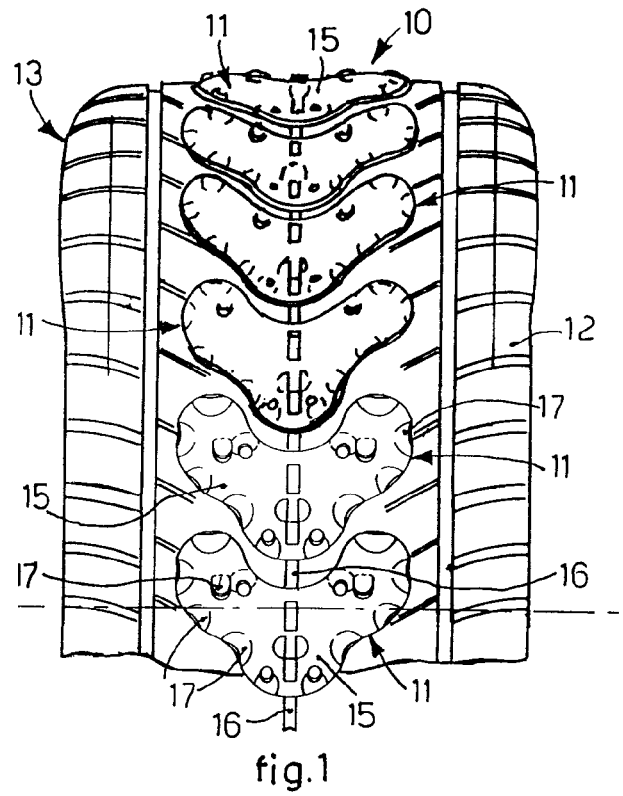
FIG. 1 shows an anti-skid device according to the present invention associated with the tire of a vehicle.

With reference to the attached drawings, an anti-skid device 10 according to the present invention consists of a plurality of modules 11 associated with each other and disposed annularly around a circular external surface, or tread 12, of a tire 13.

According to the invention, each module 11 is made of metal, and substantially comprises a shaped plate 15 and an attachment element 16.

In particular, the shaped plate 15 has a substantially plane extension, is roughly substantially V-shaped with rounded corners and an undulated perimeter, and is able to be disposed exclusively in correspondence with the tread 12 of the tire 13. Advantageously, the shaped plate 15 is slightly arched, to follow the curve of the circumference of the tread 12 of the tire 13, and adhere to it.

On the shaped plate 15 a plurality of ridges 17, studs, protrusions, hollows or other shaped gripping elements are also made, facing towards the outside during use, so as to improve the grip of the tire 13 when there is snow, ice or other on the road surface.

In the following description and drawings, the number 17 generally indicates all the ridges, protrusions or hollows, especially those provided in the undulated perimeter of the shaped plate.

Figure 2:
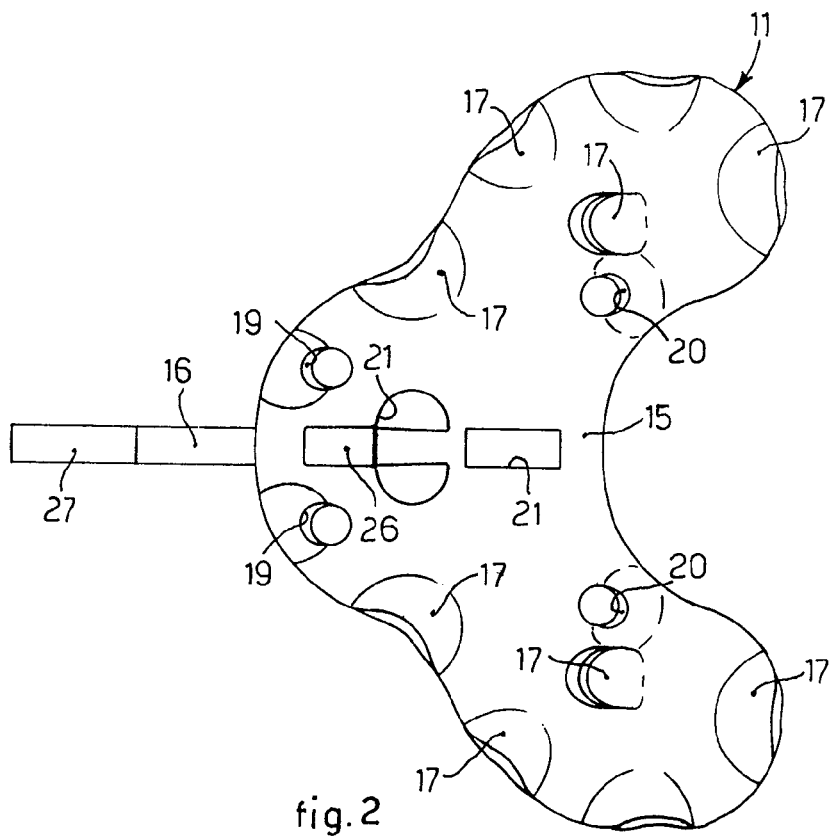
FIG. 2 shows an enlarged detail of the anti-skid device in FIG. 1.

As shown in FIG. 2, the ridges 17 partly face one direction and partly face the opposite direction, so as to guarantee the improved grip of the tire whether the vehicle is moving forward or in reverse.

On the shaped plate 15 three pairs of through holes are also made, respectively a first front pair 19, a second rear pair 20 and a third central pair 21.

The attachment element 16 comprises a first end 22, a second end 23 and a central body 25.

The first end 22 of the attachment element 16 comprises a first hook 26 coupled stably with a first of the central holes 21 of the shaped plate 15, so as to define the stable and secure reciprocal coupling of the plate 15 and the attachment element 16.

The second end 23 of the attachment element 16 comprises a second hook 27, able to be coupled with a second of the central holes 21 of a shaped plate 15 of an adjacent module 11, so as to define the connection between two successive modules 11.

Figure 3:
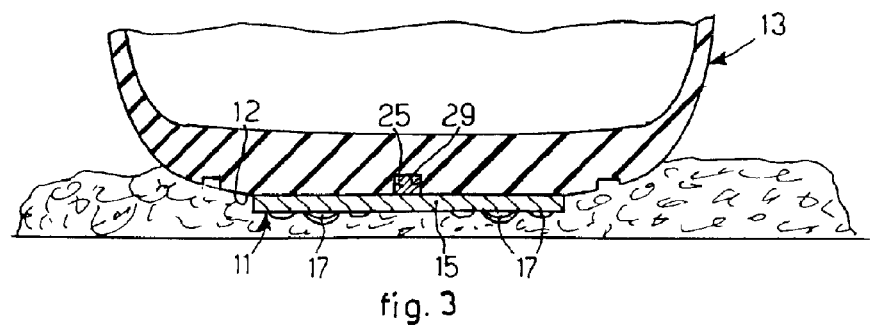
FIG. 3 shows a cross section of an enlarged detail of FIG. 1.
Figure 4:
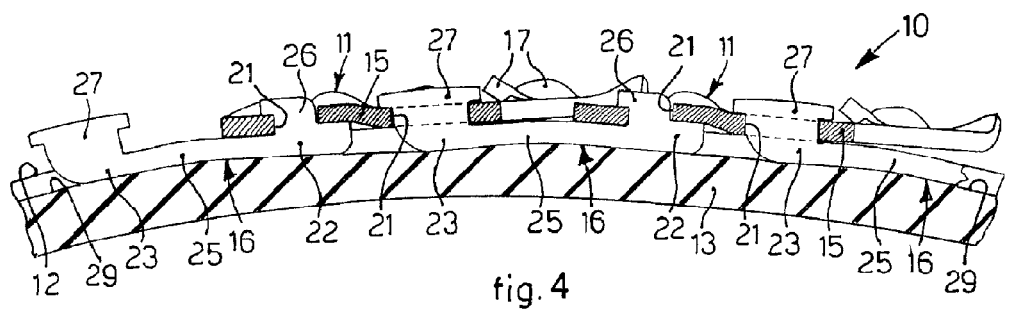
FIG. 4 shows a longitudinal section of an enlarged detail of FIG. 1.
Figure 5:
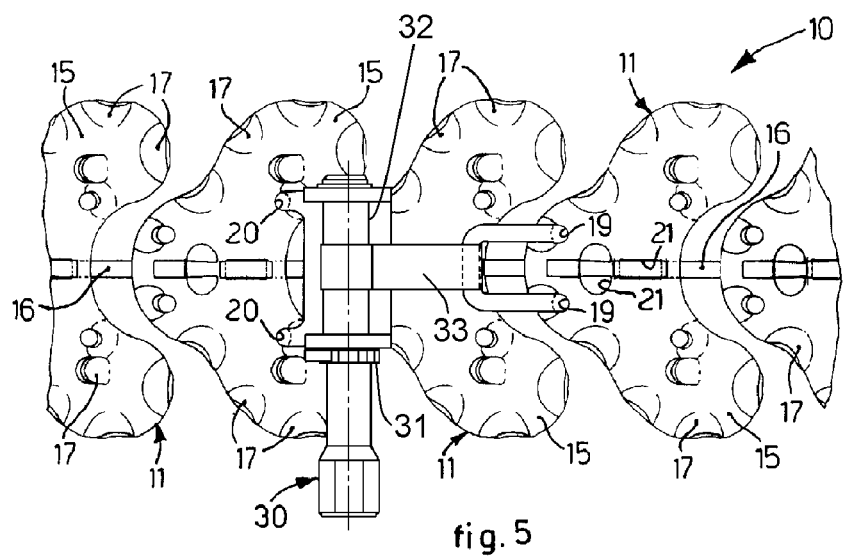
FIG. 5 shows a segment of the anti-skid device in FIG. 1.

The central body 25 of the attachment element 16 is shaped to correspond with the normal grooves 29 (FIG. 3) provided on the external surface of the tread 12 of the tire 13, so that it can be inserted with slight interference into said grooves 29 and guarantee the univocal positioning of the whole module 11 with respect to the tread 12.

With this solution, each module 11 autonomously provides to keep its correct positioning with respect to the tread 12, without providing retaining elements lateral to the tire 13.

In this case, the central body 25 of the attachment element 16 has a substantially rectilinear development since the specific groove 29 of the tread is substantially rectilinear.

It is clear that if the groove 29 of the tread had a zigzag development, indented or curved, then the central body 25 would be shaped in a similar way.

The anti-skid device 10 according to the invention also comprises an adjustment member 30, in this case mechanical with a ratchet 31 and shaft 32, and able to be attached by way of attachment 33 on one side to the pair of front holes 19 of a first module 11 and on the other side to the pair of rear holes 20 of a second module 11.

In this way it is possible to selectively increase or reduce the reciprocal distance between the two modules 11 by rotating the shaft 32 thereby increasing or decreasing the length of the attachment 33, and consequently to adapt the circumference defined by the anti-skid device 10 to the external sizes of the tire 13. This solution allows the best possible adherence of the anti-skid device 10 to the tread 12 of the tire 13.

It is clear, however, that modifications and/or additions of parts may be made to the anti-skid device 10 as described heretofore, without departing from the field and scope of the present invention.

For example, it comes within the field of the present invention to provide that the adjustment member 30 can have an elastic functioning principle, or a mixture of elastic and mechanical, instead of only mechanical as in the case shown here.

It also comes within the field of the present invention to provide that at least one module 11 comprises an attachment element 16 directly provided with the mechanical and/or elastic adjustment member.

According to another variant the shaped plate 15 has a rectilinear shape disposed transversely to the tread 12.

According to another variant, each module 11 comprises two or more attachment elements 16, able to be inserted with the relative central bodies 25 into corresponding grooves 29 provided on the tire 13.

Furthermore, in the previous case where each module 11 comprises two or more attachment elements, only some of these provide a central body 25 shaped to be inserted into the corresponding grooves 29.

According to another variant, the two central seatings 21, unlike what is shown in FIG. 2, are substantially the same, so that the attachment element 16 has at both its ends 22 and 23 two hooks 26 and 27 substantially identical.

According to another variant, the plate 15 provides one or more reinforcement ribs, not shown, able to reinforce the modules 11 structurally.

It is also clear that, although the present invention has been described with reference to specific examples, a person of skill in the art shall certainly be able to achieve many other equivalent forms of anti-skid device for a tire, having the characteristics as set forth in the claims and hence all coming within the field of protection defined thereby.

The invention claimed is:

1. An anti-skid tire device for increasing the grip of a tire of a vehicle on a road surface, said anti-skid tire device comprising:

a plurality of modules associated with each other to form substantially a chain disposed annularly around a circular external surface of a tire, wherein said modules each comprise a shaped plate having a substantially triangular configuration with rounded corners in an external shape of said shaped plate, and provided, on a surface of said shaped plate, with a plurality of gripping elements protruding during use towards the outside of said shaped plate, so as to improve the tire's ability to grip on a road surface; and an attachment element having a first end associated with said shaped plate, a second end selectively attachable to a shaped plate of an adjacent module, and a central body, radially facing, in use, towards said tire and conformed so as to be able to be inserted into a corresponding groove provided on said circular external surface of said tire;

wherein said attachment element further comprising at least one adjustment member adapted to adjust the size of said anti-skid device with respect to said tire.

2. The anti-skid tire device according to claim 1, wherein at least one of said plurality of gripping elements protrudes towards the outside from said shaped plate in a first direction of movement of said tire, and wherein at lease one of said plurality of gripping elements protrudes towards the outside from said shaped plate in a second direction of movement of said tire opposite of said first direction, so as to guarantee the grip of said tire, both when the vehicle is moving forward and in reverse.

3. The anti-skid tire device according to claim 2, wherein said shaped plate further comprising a first front pair of defined through holes, a second rear pair of defined through holes and a third central pair of defined through holes.

4. The anti-skid tire device according to claim 3, wherein said first end of said attachment element further comprising a first hook coupled with a first hole of said third central pair of through holes, and in that said second end of said attachment element comprises a second hook adapted to be coupled with a second hole of said third central pair of through holes of said shaped plate of said adjacent module.

5. The anti-skid tire device according to claim 4 further comprising an adjustment member adapted to cooperate with two adjacent modules so as to allow adjustment of the size of said anti-skid device with respect to said tire.

6. The anti-skid tire device according to claim 5, wherein said adjustment member being attachable, on one side, to said first front pair of through holes of a first of said modules, and on another side, to said rear pair of through holes of said adjacent module.

7. The anti-skid tire device according to claim 6, wherein said adjustment member being a ratchet received, on one side, in said first front pair of through holes of said first of said modules, and on another side, to said rear pair of through holes of said adjacent module.

8. An anti-skid tire system comprising:

a tire comprising an external surface and a groove defined in said external surface;

a plurality of modules associated with each other and disposed annularly around said external surface of said tire, wherein said modules each comprise a shaped plate having a substantially V-shaped configuration with rounded corners in an external shape of said shaped plate, and provided with a plurality of gripping elements protruding from an external surface of said shaped plate opposite said tire, said shaped plate of each of said modules defining therethrough a first front pair of through holes, a second rear pair of through holes and a third central pair of through holes; and an attachment element having a first end associated with said shaped plate, a second end selectively attachable to a shaped plate of an adjacent module, and a central body, radially facing, in use, towards said tire and conformed so as to be insertable into said groove provided on said external surface of said tire;

wherein said first end of said attachment element further comprising a first hook coupled with a first hole of said third central pair of through holes, and in that said second end of said attachment element comprises a second hook adapted to be coupled with a second hole of said third central pair of through holes of said shaped plate of said adjacent module.

9. The anti-skid tire device according to claim 8, wherein at least one of said plurality of gripping elements protrudes towards the outside from said shaped plate in a first direction of movement of said tire, and wherein at lease one of said plurality of gripping elements protrudes towards the outside from said shaped plate in a second direction of movement of said tire opposite of said first direction, so as to guarantee the grip of said tire, both when the vehicle is moving forward and in reverse.

10. The anti-skid tire device according to claim 8 further comprising an adjustment member adapted to cooperate with two adjacent modules so as to allow adjustment of the size of said anti-skid device with respect to said tire.

11. The anti-skid tire device according to claim 10, wherein said adjustment member being attachable, on one side, to said first front pair of through holes of a first of said modules, and on another side, to said rear pair of through holes of said adjacent module.

12. The anti-skid tire device according to claim 11, wherein said adjustment member being a ratchet received, on one side, in said first front pair of through holes of said first of said modules, and on another side, to said rear pair of through holes of said adjacent module.

13. The anti-skid tire device according to claim 8, wherein said attachment element further comprising at least one adjustment member adapted to adjust the size of said anti-skid device with respect to said tire.

14. The anti-skid tire device according to claim 8, wherein said shaped plate having a substantially arched configuration corresponding to said external surface of said tire, and wherein a gap in the V-shaped configuration of said shaped plate of a first module being adapted to receive therein a converged tip of the V-shaped configuration of said shaped plate of an adjacent module.

15. An anti-skid tire system comprising:

a tire having an external surface and a groove defined in said external surface;

a plurality of modules associated with each other and disposed annularly around said external surface of said tire, wherein said modules each comprise a shaped plate having a substantially V-shaped configuration with rounded corners in an external shape of said shaped plate, and provided with a plurality of gripping elements protruding from an external surface of said shaped plate opposite said tire, said shaped plate of each of said modules defining therethrough a first front pair of through holes, a second rear pair of through holes and a third central pair of through holes; and an attachment element having a first end associated with said shaped plate, a second end selectively attachable to a shaped plate of an adjacent module, and a central body, radially facing, in use, towards said tire and conformed so as to be insertable into said groove provided on said external surface of said tire;

wherein said attachment member further comprises an adjustment member adapted to cooperate with two adjacent modules so as to allow adjustment of the size of said anti-skid device with respect to said tire;

first end of said attachment element further comprises a first hook coupled with a first hole of said third central pair of through holes, and in that said second end of said attachment element comprises a second hook adapted to be coupled with a second hole of said third central pair of through holes of said shaped plate of said adjacent module.

16. The anti-skid tire device according to claim 15, wherein at least one of said plurality of gripping elements protrudes towards the outside from said shaped plate in a first direction of movement of said tire, and wherein at lease one of said plurality of gripping elements protrudes towards the outside from said shaped plate in a second direction of movement of said tire opposite of said first direction, so as to guarantee the grip of said tire, both when the vehicle is moving forward and in reverse.

17. The anti-skid tire device according to claim 16, wherein said adjustment member being attachable, on one side, to said first front pair of through holes of a first of said modules, and on another side, to said rear pair of through holes of said adjacent module.

18. The anti-skid tire device according to claim 17, wherein said adjustment member being a ratchet received, on one side, in said first front pair of through holes of said first of said modules, and on another side, to said rear pair of through holes of said adjacent module.

19. The anti-skid tire device according to claim 18, wherein said shaped plate having a substantially arched configuration corresponding to said external surface of said tire, and wherein a gap in the V-shaped configuration of said shaped plate of a first module being adapted to receive therein a converged tip of the V-shaped configuration of said shaped plate of an adjacent module.

* * * * *